A. H. PELTIER.
AUXILIARY SPRING.
APPLICATION FILED OCT. 25, 1920.
1,408,394.
Patented Feb. 28, 1922.
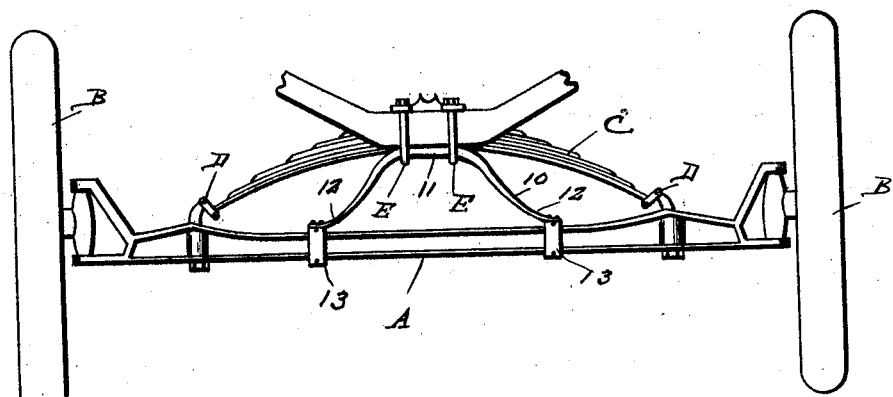
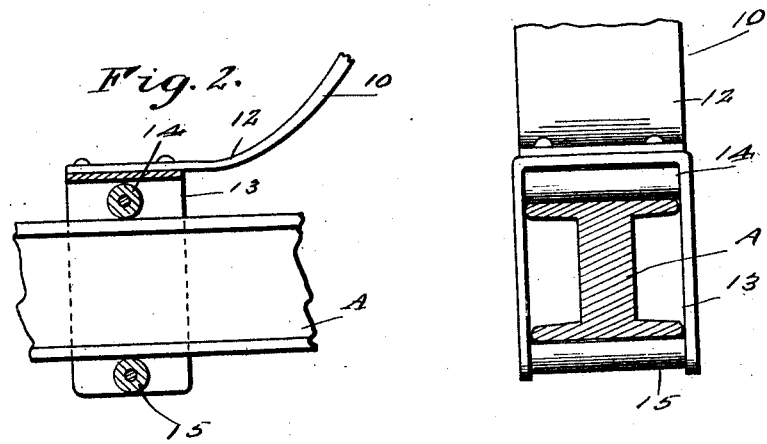

UNITED STATES PATENT OFFICE.

ARTHUR H. PELTIER, OF BRISTOL, TENNESSEE.

AUXILIARY SPRING.

1,408,394.  Specification of Letters Patent.  Patented Feb. 28, 1922.

Application filed October 25, 1920. Serial No. 419,317.

*To all whom it may concern:*

Be it known that I, ARTHUR H. PELTIER, a citizen of the United States, residing at Bristol, in the county of Sullivan and State of Tennessee, have invented new and useful Improvements in Auxiliary Springs, of which the following is a specification.

This invention relates to springs for motor vehicles and has for its object the provision of an auxiliary spring designed for use in conjunction with the front spring of a Ford automobile whereby to strengthen the same and check the rebound so as to prevent breakage.

An important and more specific object is the provision of an auxiliary spring of this character which is formed as a single leaf tapering in thickness from its center to its ends and secured at its central portion by means of the same clips which hold the front spring to the frame and having its ends slidably associated with the front axle.

An additional object is the provision of a device of this character which will be simple and inexpensive in construction, highly efficient in use, easy to install, durable in service, and a general improvement in the art.

With the above and other objects and advantages in view, the invention consists in the details of construction to be hereinafter more fully described and claimed and illustrated in the accompanying drawings in which—

Figure 1 is a front elevation of my device in position,

Figure 2 is a detail longitudinal sectional view through one end portion thereof, and Figure 3 is a cross sectional view through the front axle showing one end of my device in end elevation.

Referring more particularly to the drawings, the letter A designates the front axle of a Ford automobile carrying the usual wheels B and having associated therewith the usual front spring C having its ends secured by shackles D and having its central portion secured by clips E.

In carrying out my invention I provide an auxiliary spring 10 formed preferably as a single leaf decreasing in thickness from its central portion 11 to its ends 12. This auxiliary spring is disposed immediately under the usual spring C and is held in place by the ordinary clips E.

In order that the ends of my spring may be slidably associated with the front axle, I provide upon each end of my spring a bracket 13 of U-shape and this bracket straddles the front axle. Journaled within each bracket are upper and lower rollers 14 and 15, respectively, which engage the upper and lower sides of the axle A.

In the use of my device it will be seen that my spring will not interfere with the flexibility of the ordinary spring and will not detract from the easy riding qualities of the car. However, upon striking an obstruction or the like, my spring will operate to cushion the ordinary spring and reinforce it so as to prevent breakage, especially when the rebound occurs.

From the foregoing description and a study of the drawings it will be apparent that I have thus provided a simple and inexpensive auxiliary shock absorbing spring which may be readily attached to an automobile having a transverse front spring and which will very efficiently operate to cushion shocks and jars at all times.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. In combination with the front axle and transverse spring of an automobile, an auxiliary spring pressed against the underside of the spring and secured thereto by the usual spring clip, inverted U-shaped brackets carried by the ends of the auxiliary springs and straddling the axle, and rollers journaled within said brackets and engaging against the top and bottom of the axle.

2. In combination with the front axle and transverse spring of an automobile, an auxiliary spring disposed against the underside of the spring and secured thereto by the ordinary spring clip, inverted U-shaped brackets carried by the ends of the auxiliary springs and straddling the axle, and rollers journaled within the bight and end portions of said brackets and engaging against the top and bottom of the axle respectively, said auxiliary spring being formed as a single leaf decreasing in thickness from its center to its ends.

In testimony whereof I affix my signature.

ARTHUR H. PELTIER.